United States Patent [19]

Periou

[11] Patent Number: 4,781,414

[45] Date of Patent: Nov. 1, 1988

[54] DEVICE FOR ADJUSTING THE HEIGHT AND THE ATTITUDE OF A SEAT STRUCTURE, IN PARTICULAR FOR A VEHICLE

[75] Inventor: Pierre Periou, Cergy Pontoise, France

[73] Assignee: Rockwell-CIM, France

[21] Appl. No.: 112,785

[22] Filed: Oct. 26, 1987

[30] Foreign Application Priority Data

Nov. 5, 1986 [FR] France ............................ 86 15421

[51] Int. Cl.$^4$ ............................................. A47C 1/02
[52] U.S. Cl. .................................... 297/313; 248/396; 248/429
[58] Field of Search ............... 248/396, 371, 393, 394, 248/398, 419, 429, 430; 297/88, 313, 311, 322

[56] References Cited

U.S. PATENT DOCUMENTS

| | | | |
|---|---|---|---|
| 2,638,150 | 5/1953 | May .................................... | 297/313 |
| 3,243,227 | 3/1966 | Katz .................................... | 297/88 X |
| 3,692,271 | 9/1972 | Homier ................................. | 248/394 |
| 4,074,886 | 2/1978 | Yates ................................... | 248/396 X |
| 4,194,783 | 3/1980 | Cycowicz et al. ..................... | 297/88 |
| 4,222,543 | 9/1980 | Gedig et al. ......................... | 248/396 X |
| 4,487,390 | 12/1984 | Miyashita ............................ | 248/396 |
| 4,508,386 | 4/1985 | Hofmann ........................... | 248/394 X |
| 4,616,875 | 10/1986 | McFalls et al. .................... | 248/394 X |

Primary Examiner—Ramon O. Ramirez

[57] ABSTRACT

This device comprises elements for fixing it to slides (6) which are longitudinally movable on fixed slides (10), other elements allowing the mounting of a seat (4) carrying a cushion (3) and a backrest (2), and, on each side of the seat structure, a cam (5) interposed between the slide (6) and the seat (4). There are provided in the cam (5) bearing tracks (7, 8) for the cam (5) on the slide (6) for the adjustment of the cam (5) in height. Jacks (12, 13) control the height of the cam (5) and the attitude adjusting movement of the seat (4) relative to the cam. This device permits the obtainment of the exact required attitude path, is of small overall size and avoids practically all play or vibrations.

20 Claims, 6 Drawing Sheets

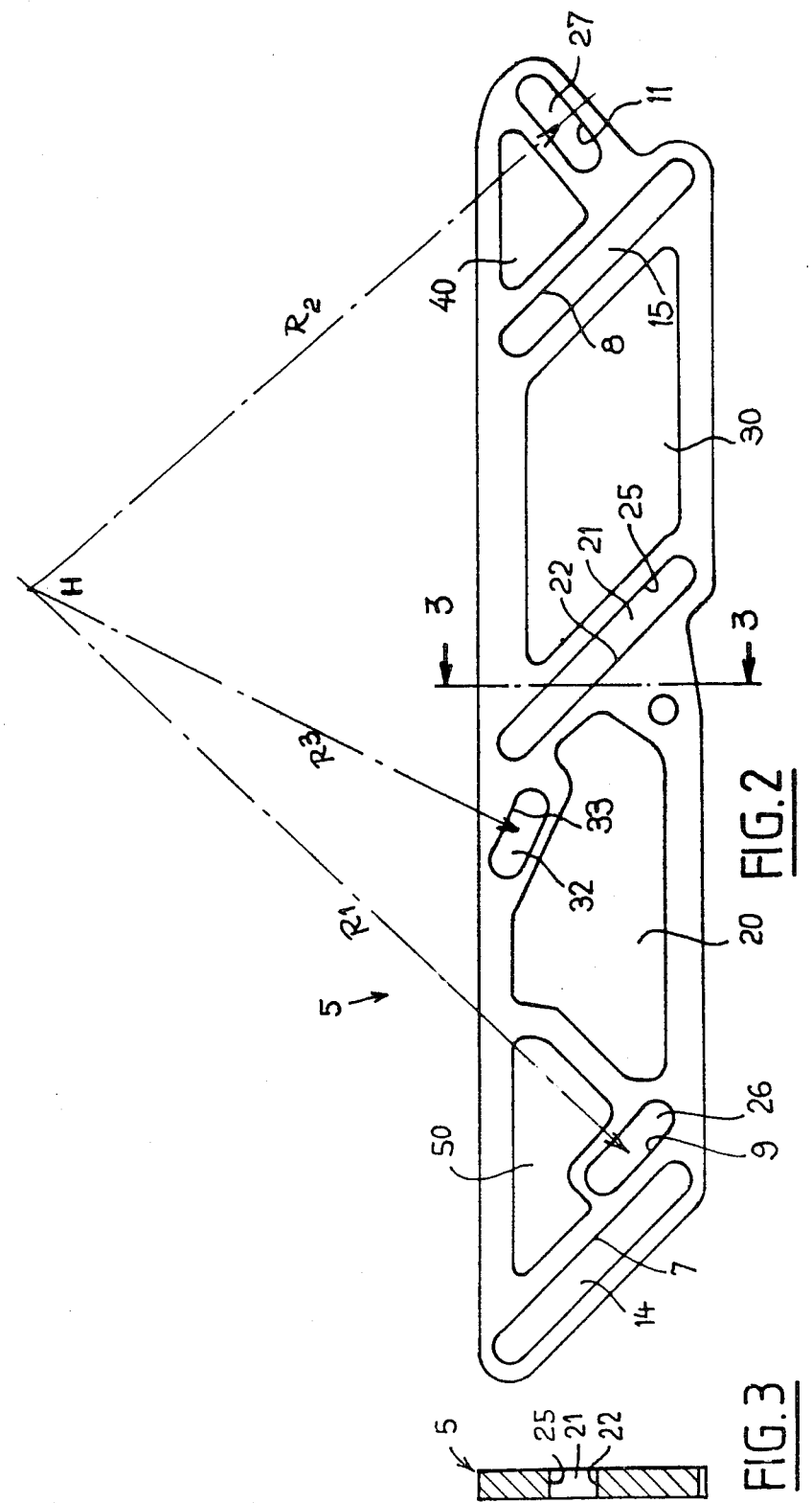

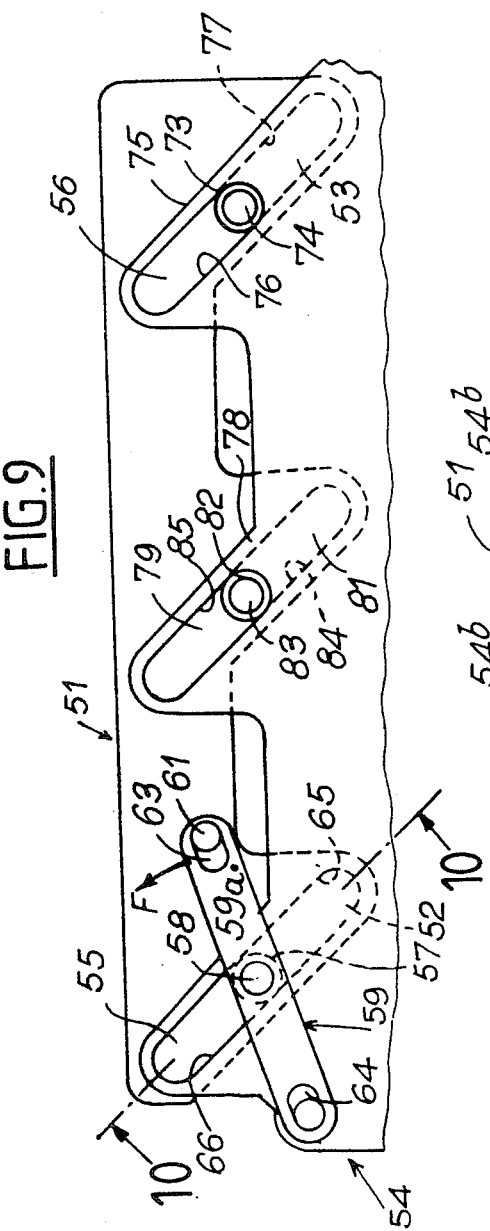

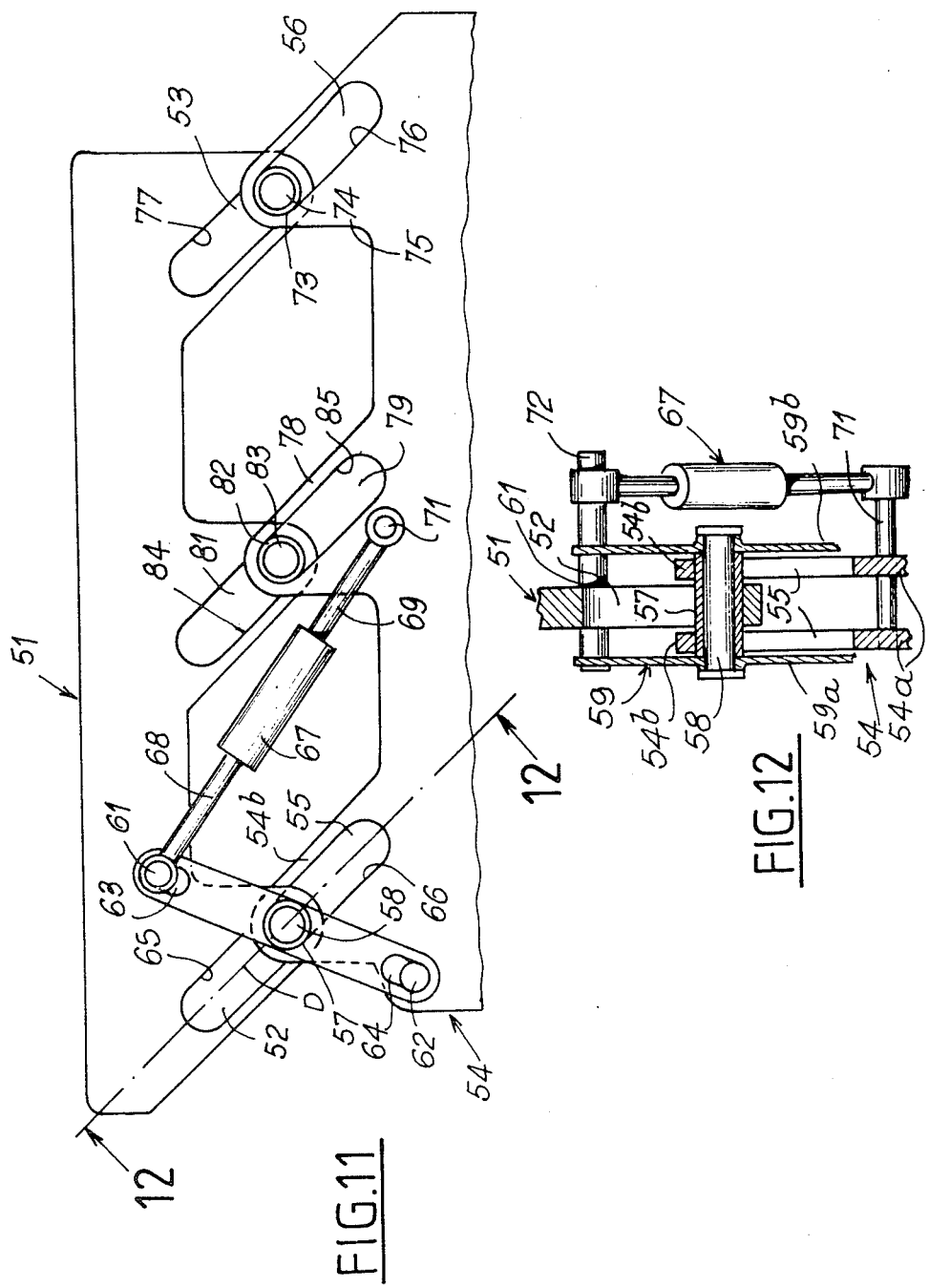

DEVICE FOR ADJUSTING THE HEIGHT AND THE ATTITUDE OF A SEAT STRUCTURE, IN PARTICULAR FOR A VEHICLE

The present invention relates to a device for adjusting the height and the attitude of a seat structure in particular for a vehicle, of the type comprising slides longitudinally movable on the floor of the vehicle, a seat carrying a cushion and a backrest, and means for adjusting the seat in height and in attitude.

A raising device is known which permits the independent adjustment of the height and the attitude of the seat by means of two motorized systems, respectively acting on the front and rear of the seat structure. Now, the rear supporting the main part of the weight of the passenger is therefore more loaded than the front of the seat structure so that, when the two electric motors are actuated simultaneously, the rear rises less than the front. Consequently, a second operation is necessary for correcting the inclination of the seat structure by actuation of the motor associated with the rear of the seat structure.

Thus, the operation of this type of raising device is hardly convenient since it is only by successive approximations that the height and the inclination, or attitude, of the seat can be adjusted separately. Further, such an adjusting mechanism only permits tipping the seat about transverse axes passing through its front or rear edge. Now, in order to ensure an improved comfort for the passengers, it is desirable not only to be in a position to adjust the height of the seat structure to the desired value, but also to impart thereto an angle of attitude by rotation of the seat about a transverse horizontal axis passing through a given point of the body of the passenger.

This known adjusting device therefore does not permit the imparting to the seat such a tilting movement about this axis.

A raising system is also known which is essentially constituted by link mechanisms whereby it is possible, on one hand, to adjust the height of the seat and, on the other hand, adjust its attitude by two independent tilting movements of the front and rear of said seat. This second construction is a closer approach than the preceding construction to the desired attitude path of movement defined hereinbefore. However, the paths obtained do not correspond to the effectively desired path owing to the fact that they are related to the rotation of links. Further, these mechanisms are space-consuming, fragile and sophisticated, and therefore difficult to manufacture.

An object of the invention is to provide an adjusting device of the type having two independent raising and attitude adjusting movements whereby it is possible to obtain an attitude path exactly corresponding to that desired, which is of reduced overall size relative to the prior devices, simpler to manufacture and therefore cheaper, and which practically completely avoids any elasticity of the mechanisms due to creation of play or vibrations.

According to the invention, the means for adjusting the seat in height and in attitude comprise, on each side of the seat structure, a cam interposed between the slide and the seat and on which are provided:

bearing tracks for the cam on the slide for the adjustment of the cam and seat in height;

and bearing tracks for the seat on the cam whose profiles are a function of the desired attitude adjusting movements for the seat relative to the cam; this device comprising means for controlling, on one hand, the height of the cam and the seat relative to the slide and, on the other hand, the attitude of the seat relative to the cam.

According to a preferred embodiment, the cam is formed by a plate in which are provided at least two elongated and inclined openings whose upper edges constitute the bearing tracks of the cam on rolling or sliding elements mounted on supports connected to the slide.

According to another feature of the invention, the bearing tracks for the seat on the cam are constituted by the lower edges of at least two inclined elongated openings provided in the cam and having profiles in correlation with the desired attitude adjusting movement, preferably a tilting of the seat about a horizontal transverse axis passing at a given height through the place reserved for the passenger, the seat being equipped with rolling or sliding elements which cooperate with said bearing tracks for the seat on the cam.

The openings permitting the adjustment in height of the cam and the seat are normally rectilinear and inclined to the horizontal plane, while the openings formed in the cam for permitting the attitude movement of the seat have a geometry which is a direct function of the desired inclination movement for the seat, which effectively permits the obtainment of the exact required path for the attitude movement.

Lastly, each of the two cams of this device may be formed by a moulded or blanked metal part or by a part of moulded plastics material reinforced with a metal lattice or by a welded metal lattice whose manufacture is relatively simple and cheap.

Further features and advantages of the invention will appear from the following description with reference to the accompanying drawings which illustrate two embodiments of the invention by way of non-limitative examples:

FIG. 2 is an elevational view of a first embodiment of the cam of the adjusting device according to the invention;

FIG. 3 is a vertical sectional view taken on line 3—3 of FIG. 2.

FIG. 9 is a longitudinal elevational view with parts cut away of a second embodiment of the cam and associated slide, the cam being in the lower position thereof;

FIG. 10 is a sectional view taken on line 10—10 of FIG. 9;

FIG. 11 is a view similar to FIG. 9, completed by a jack controlling the cam, the latter being shown in the upper position thereof;

FIG. 12 is a sectional view taken on line 12—12 of FIG. 11.

Figure 1:
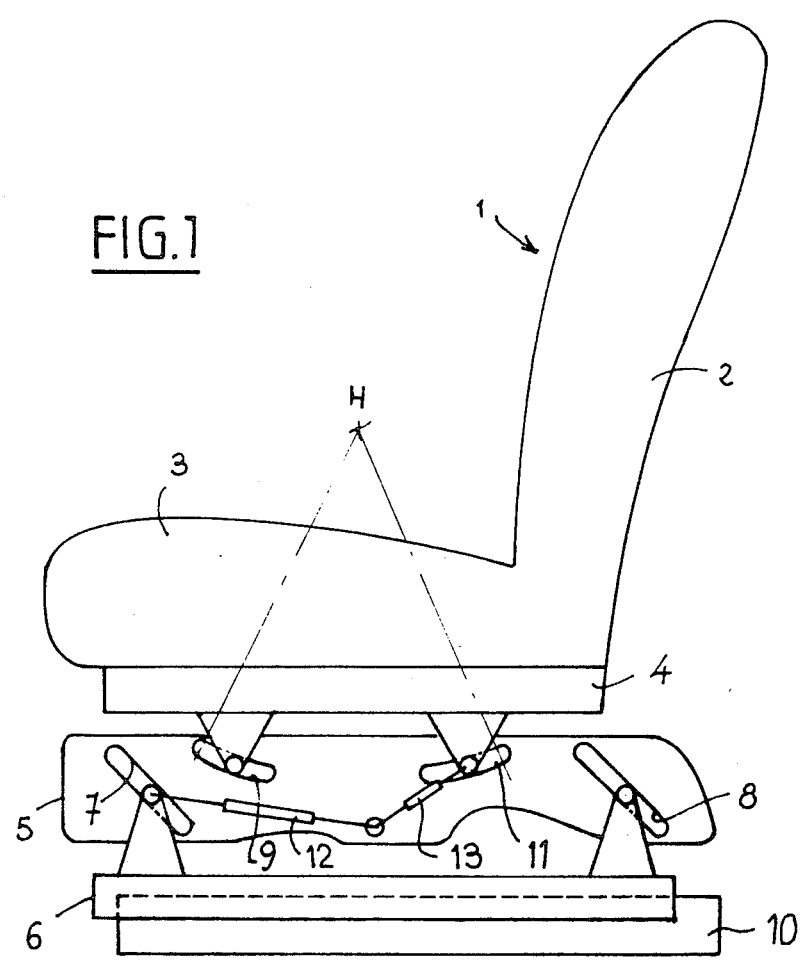
FIG. 1 is a diagrammatic side elevational view of an automobile vehicle seat structure provided with a device according to the invention for the adjustment of the height and the attitude of the seat structure.

FIG. 1 shows an automobile vehicle seat structure 1 comprising a backrest 2 and a cushion 3 which rests on a seat 4 mounted to bear on a complex cam 5 which is supported by a movable slide 6 constituting a base and longitudinally slidable on a fixed slide 10 connected to the floor of the vehicle.

The mounting of the seat structure proper 2, 3 on the seat 4 and the mounting of the slide 6 are known per se and do not require a special description.

The whole of the mechanism comprises two similar cams 5 and two similar slides 6 placed on each side of the seat structure 1 and fixed together by the upper part of the seat structure (seat 4 and optionally also by transverse bars (not shown).

The cam 5 is constituted by a moulded or blanked metal sheet, or by a sheet moulded from plastics material and reinforced with a welded metal latttice or by a welded metal lattice. Provided on each cam 5 are, on one hand, bearing tracks 7, 8 for the cam 5 on the slide 6 for the adjustment of the cam 5 and seat 4 in height and, on the other hand, bearing tracks 9, 11 for the seat 4 on the cam 5, which have profiles which are a function of the desired attitude adjusting movement for the seat 4 relative to the cam 5.

The device further comprises means for controlling, on one hand, the height of the cam 5 and the seat 4 relative to the slide 6 and, on the other hand, the attitude of the seat 4 relative to the cam 5. In the presently-described embodiment, these means comprise, for the adjustment of the height of the cam 5, a jack 12 anchored on one hand to the slide 6 and on the other hand to the cam 5 and, for the adjustment of the inclination or the attitude of the seat 4, a jack 13 anchored to the cam 5 and to the seat 4.

The cam 5 will now be described in more detail with reference to FIG. 2.

Figure 8:
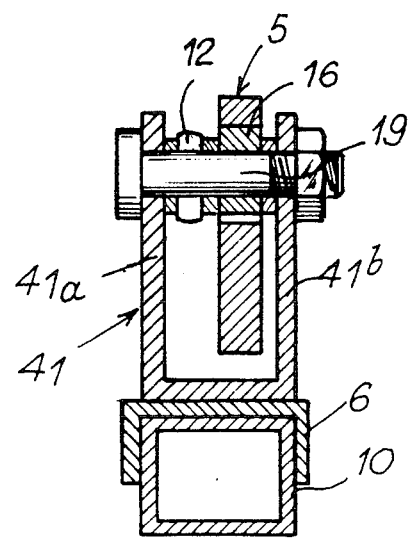
FIG. 8 is a vertical sectional view taken on line 8—8 of FIG. 4.

Provided in the cam 5 are a plurality of apertures 20, 30, 40, 50 and, in the vicinity of the front and rear ends, at least two rectilinear elongated openings 14, 15 inclined to the horizontal with the same inclination. The respective upper edges 7, 8 of the openings 14, 15 constitute the bearing tracks of the cam 5 on rolling rollers 16, 17 mounted on supports constituted by yokes 41, 18 fixed to the slide 6. Each roller 16, 17 is mounted on a spindle 19 (FIG. 8) extending through two branches 41a, 41b of the yoke 41. The cam 5 and the jack 12 are placed between the branches 41a, 41b.

The bearing of the cam 5 on the rollers 16, 17 therefore occurs by the upper edges 7, 8 constituting the tracks for the adjustment of the cam in height.

Further, formed in the cam 5 between the openings 14 and 15, and preferably in the central region of the cam, is a second rectilinear elongated opening 21 similar to the openings 14, 15 and having the same inclination whose lower edge 22 constitutes a counter-track for the adjustment of the cam 5. Indeed, bearing against this counter-track 22 is a rolling roller 23 which is mounted in a manner similar to the mounting of the rollers 16, 17 in a yoke 24 fixed to the slide 6 between the yokes 17 and 18.

The mounting of the roller 23 is arranged in such manner that the latter bears, not on the upper edge 25 of the opening 21 but on its lower edge 22 forming the counter-track. This can be achieved by a suitable relative positioning of the roller 23 and the counter-track 22 or by elastically yieldable means (not shown) adapted to exert on the cam 5 an upwardly directed return force which maintains this cam in bearing relation to the counter-track 22 on the roller 23.

This assembly permits the elimination of the possible play or vibrations of the cam 5 relative to the slide 6 which could arise owing to the fact that there is necessarily a clearance (seen in FIG. 8) between the rolling rollers 16, 17 and the lower edges of the openings 14, 15.

Figure 4:
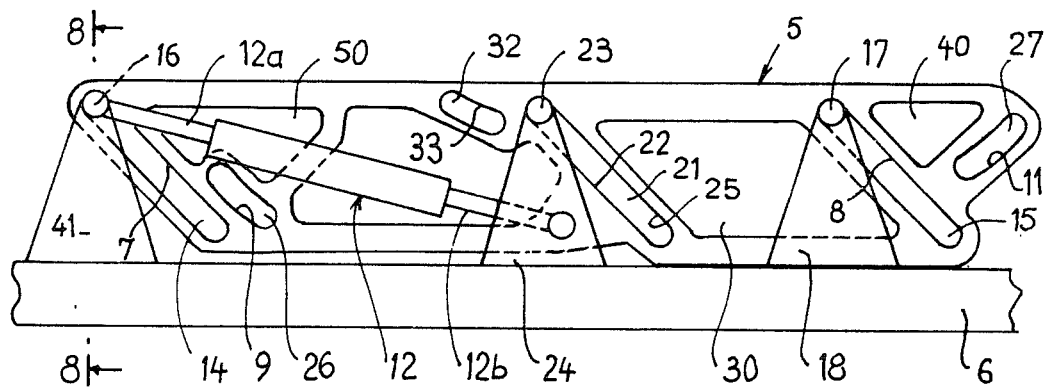
FIG. 4 is an elevational view of the cam of FIG. 2 to a reduced scale mounted on a slide of the seat structure and provided with a jack controlling the adjustment in height, the cam being in the lower position thereof.
Figure 5:
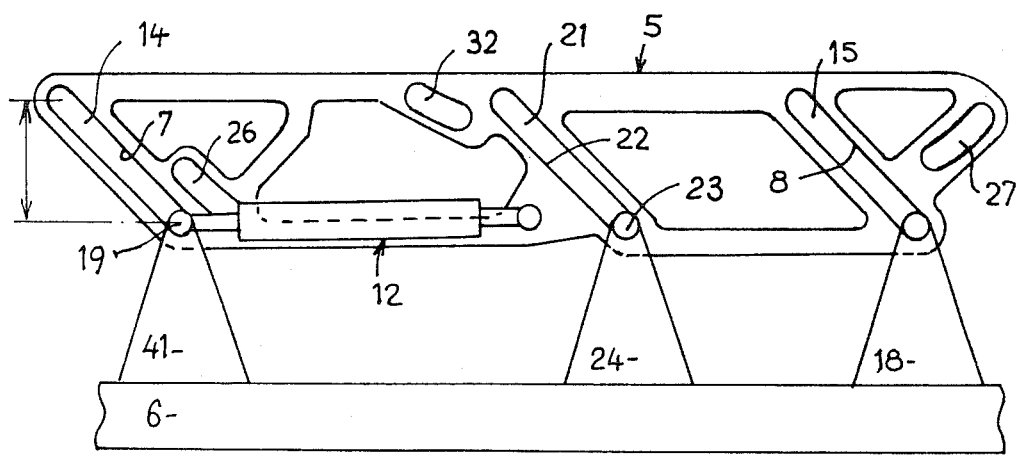
FIG. 5 is a view similar to FIG. 4 of the cam in the upper position thereof.

The jack 12 is a double-acting jack and its two rods 12a, 12b are respectively articulated to the spindle of the roller 16 and to a point of the lower part of the cam 5 the rod 12b being interposed between the two branches of the yoke 24. Furthermore, the cam 5 is also located between the branches of the third yoke 18. Starting in the lower position of the cam 5 (FIG. 4), the jack 12 is operative in traction and brings the cam 5 to the upper position (FIG. 5) by the rolling of the two rollers 16, 17 on the tracks 7, 8 and the rolling of the central roller 23 on the counter-track 22, the rods 12a, 12b being retracted.

According to another feature of the invention, the tracks 9, 11 of the bearing of the seat 4 on the cam 5 are constituted by the lower edges of at least two inclined and elongated openings 26, 27 provided in the cam 5, preferably in the vicinity of the ends of the latter. The openings 26, 27 have a profile correlative with the desired attitude adjusting , preferably, as indicated hereinbefore, a tilting of the seat 4 about a horizontal transverse axis passing through a point H located at a given height in the place reserved for the passenger. In this case, the openings 26, 27, and therefore the bearing-tracks 9, 11, are curved and have respective radii of curvature R1, R2 of the tilting of the seat 4 about the axis passing through H.

The seat 4 is provided with a front fork 28 and a rear fork 29 carrying at their lower ends rolling rollers 31 which bear against the tracks 9 and 11.

Furthermore, formed in the cam 5, is a third elongated opening 32 having a curvature corresponding to a radius R3 of tilting about H and having an upper edge 33 which constitutes a counter-track against which a rolling roller 34 carried by a yoke 35 mounted on the seat 4 is maintained. The bearing of the roller 34 against the counter-track 33 is achieved in the same way as the bearing of the roller 23 against the counter-track 22 and for the same purpose, namely to eliminate any possible play or vibration between the seat 4 and the cam 5.

Figure 6:
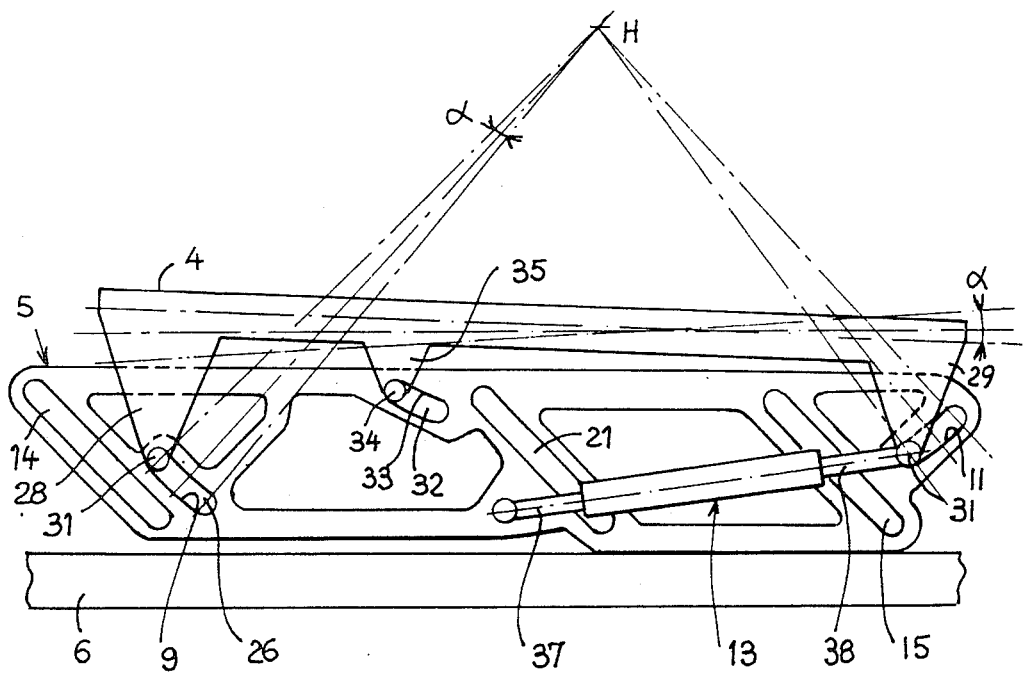
FIG. 6 is an elevational view of the cam, the slide and the seat together with a jack controlling the attitude of the seat relative to the cam (the jack controlling the height of the cam not having been shown in order to avoid complicating the drawing), the seat being shown in the rearwardly inclined position thereof.
Figure 7:
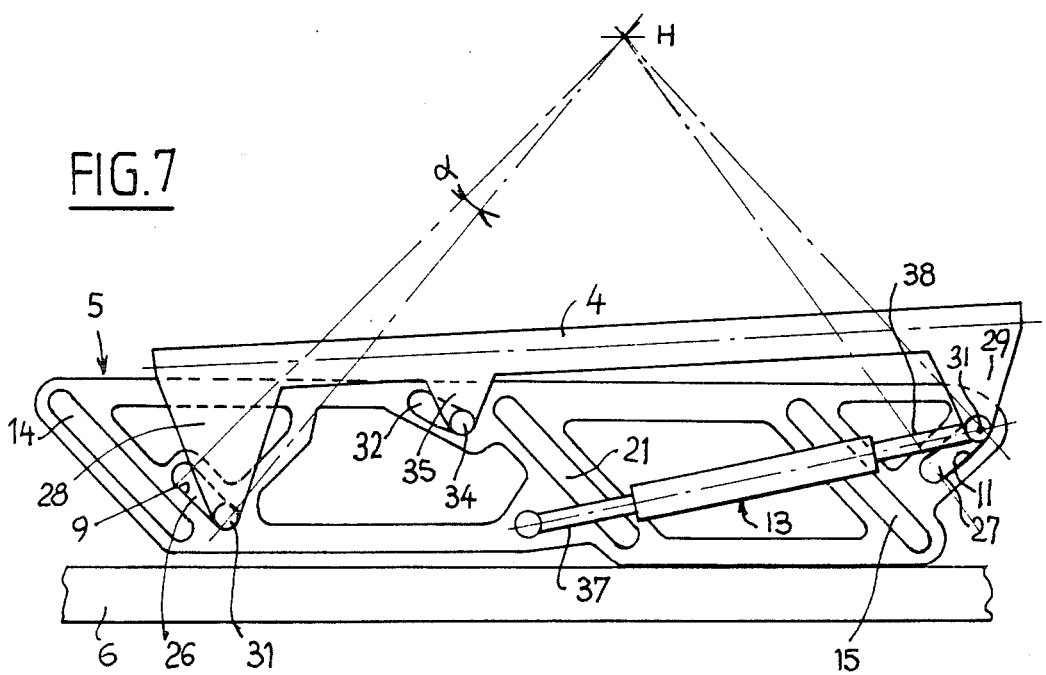
FIG. 7 is a view similar to FIG. 6 of the seat inclined toward the front of the vehicle.

Lastly, the control of the attitude or inclination of the seat 4 can be achieved, in the presently-described embodiment, by a double-acting jack 13 whose first rod 37 is anchored to the cam 5 and whose rod 38 is articulated to the seat 4, preferably on the spindle of one of the rollers 31, namely the rear roller 31 in the presently-described embodiment (FIGS. 6 and 7). The rod 37 may be articulated to the same spindle as the rod 12b of the jack 12, which simplifies the assembly of the jacks. The cam 5 and the rod 38 are disposed between the branches of the yokes 28, 29.

The actuation of each jack 13 associated with a cam 5 permits the imparting to the seat 4 of an inclination movement determined by the radii of curvature R1, R2, R3 of the tracks 9, 11 and of the counter-track 33, of an angular amplitude α between the maximum rearward tilting position (FIG. 6) and the maximum forward tilting position (FIG. 7).

The second embodiment of the invention illustrated in FIGS. 9 to 12 has for essential advantage to reduce the overall size of the adjusting device relative to the preceding embodiment.

Indeed, the cam 51 here comprises two elongated openings 52, 53 inclined at the same angle to the horizontal, formed at the two ends of the cam, and the slide 54 also has two elongated openings 55, 56 inclined in the same way as the openings 52, 53 and formed in facing relation to the latter, the upper and lower edges of these different openings being rectilinear and contained in parallel planes.

Extending through the two openings 52, 56 is a roller 57 rotatively mounted on a transverse spindle 58 which also extends through the two openings 52, 55. A double link 59 having two parallel elements 59a, 59b disposed on each side of the cam 51 and the slide 54, is articulated to the end of the spindle 58 which extends through said elements 59a, 59b (FIG. 12) so as to be pivotable about the spindle 58.

The two ends of the elements 59a, 59b are connected by transverse pins 61, 62 which are slidable in a direction perpendicular to the spindle 58 while remaining parallel to the latter, in openings 63, 64 provided in the ends of the elements 59a, 59b and in corresponding openings provided in the cam 51 and in the slide 54. Furthermore, the roller 57 can simultaneously roll on the cam 51 along a bearing track 65 formed by the upper edge of the opening 52 and on the slide 54 along a bearing track 64 formed by the lower edge of the opening 65. A double-acting jack 67 has its two rods 68, 69 respectively articulated to the cam 51 and to a pin 71 mounted on the slide 54, the articulation of the rod 68 being preferably, as shown in FIGS. 11 and 12, a lateral extension 72 of the upper pin 61.

The slide 54 is formed by two parallel plates 54a extended in their upper part by a yoke formed by two parallel branches 54b through which the spindle 58 and the roller 57 extend, the cam 51 being interposed between the two branches 54b and between the elements 59a, 59b of the link 59.

At the end of the cam 51 and the slide 54 opposed to the openings 52, 55, a second roller 73 rotatively mounted on a spindle 74 extends, in the same way as the latter, through the two parallel branches 75 of a yoke of the slide 54, similar to the yoke 54b. The spindle 74 and the roller 73 therefore extend through the two openings 53,56, the spindle 74 being mounted on the cam 51. The mounting of the roller 73 and its dimensioning and that of the openings 53, 56 are such that the roller 73 rolls along a bearing track 76 constituted by the lower edge of the opening 56 of the slide 54 and simultaneously along a second bearing track 77 constituted by the upper edge of the opening 53 of the cam 51. It will be understood that the rectilinear tracks 75, 77 are parallel to each other and to the corresponding tracks 66 and 65.

In the central region of the slide 54 the latter includes a third yoke 78 similar to the two yokes 54b and 75, there being provided in each of the branches of the yoke an opening 79 similar to the openings 55 and 56. Likewise, an elongated and inclined opening 81 similar to the opening 52 and 53 is provided in the cam 51 in facing relation to the opening 79. A roller 82 is rotatively mounted on a spindle 83 connected to the cam 51, these two elements extending through the two branches of the yoke 78 and the cam 51. The dimensioning of the openings 79 81 and the mounting of the roller 82 are so arranged that the roller is in rolling bearing relation to a first counter-track 84 constituted by the lower edge of the opening 81 of the cam 51 and in bearing relation to a second counter-track 85 constituted by the upper edge of the opening 79 of the slide 54. This arrangement has for purpose to substantially eliminate any play between the cam 51 and the slide 54, which would otherwise occur if the device had only the openings 52, 55 with their roller 57 and the openings 53, 56 with their roller 73.

FIG. 9 shows the cam 51 in its lower position on the slide 54. In this position, the three rollers 57, 73, 82 are in bearing relation to the lower rounded ends of the openings 55, 56, 79 of the slide 54 and in bearing relation to the upper rounded ends of the openings 52, 53, 81 of the cam 51, the rods 68, 69 of the jack 67 being retracted to the full extent.

When the jack 67 is actuated, the latter causes the link 59 to pivot about its articulation point on the fixed slide 54 (arrow F, FIG. 9). This pivoting of the link 59 drives the spindle 58 and the roller 57 which rolls along its bearing tracks 65, 66 and the roller 73 rolls along its bearing tracks 76, 77 and the roller 82 rolls along its counter-tracks 84, 85. The cam 51 is therefore progressively raised above the slide 54 to its maximum height (FIG. 11) in which the rollers 67, 73, 82 abut against the upper rounded ends of the openings 54, 56, 79, the rods 68,69 of the jacks 67 being fully extended. At the end of the pivoting of the link 59, the cam 51 has therefore travelled through a complete raising travel, whereas the rollers 57, 73, 82 have only effected a semi-travel in height owing to the simultaneous rolling thereof along the tracks and counter-tracks and their displacement in height. During the rotation of the link 59, the pins 61, 62 slide in the respective apertures 63, 64 and in the apertures of the cam 51 and slide 54 thereby permitting variations in the distance between the direction of the displacement D of the roller 57 and the pins 61, 62.

As a variant, the number of openings respectively formed in the cam 51 and in the slide 54 could be reduced to one with consequently a single roller 57, the roller 73 and the openings 53, 56 being eliminated, the openings and the associated roller and link being suitably positioned. The second roller 82 and its counter-bearing tracks would then however be maintained.

Likewise, the jack 67 could be replaced by any other equivalent control means permitting the raising movement of the cam 51.

In the lower position, the vertical overall size of such an adjusting device corresponds to one half of the height of a cam such as that of FIGS. 2 to 8.

The device for adjusting the height and attitude or tilt of the seat according to the invention is particularly adapted for its use on an automobile seat structure in which the available spaces are extremely small owing to its small overall size relative to that of known devices.

Another essential advantage of the invention resides in the fact that it permits the disassociation of the attitude or tilt path of the sea structure from the kinematics of the latter since it is indeed possible to obtain any desired attitude or tilt path from a corresponding geometry of the tracks and counter-tracks formed in the cam. In this way, one is sure to obtain the exact desired path for the seat by means of cams having an excellent rigidity and a minimum overall size.

The fact of constructing the cams 5 from a folded sheet, moulded or forged parts, or from parts moulded from plastics material reinforced with lattices, or from a welded lattice structure, considerably simplifies the manufacture of the device relative to that of prior structures. This also permits a marked decrease in the original clearances or play and in those due to wear, by practically completely eliminating the vibrations and imprecisions of operation liable to result in discomfort for the user of the seat structure.

The following variants may be in particular mentioned: the number of tracks required for each movement (raising and attitude) may be reduced to one or exceed two. Further, at least one counter-track is provided for each movement. The rollers 16, 17, 23, 31 may be replaced by sliding shoes, although the efficiency is in this case slightly inferior owing to the replacement of the rolling action by a rubbing action. Further, the openings formed in the cam 5 could be replaced by projecting ramps or ribs, preferably in one piece with the cam, and the locations of these guiding openings or ramps may vary. The jacks 12, 13, 67 may be replaced by motorized gearing associated with racks mechanically connected to the cams 5 and the slides 6.

The invention is applicable to seat structures other than those of vehicles.

What is claimed is:

1. A device for adjusting the height and the attitude of a seat structure in particular of a vehicle, said device comprising:
   slides for mounting a seat on the floor of the vehicle;
   a cushion and a backrest carried by the seat;
   adjusting means for adjusting the seat in height and in attitude, located on each side of the seat structure;
   said adjusting means comprising a cam interposed between the slide and the seat on each side of the seat;
   at least one first bearing track for the bearing of each cam on the respective slide for the adjustment for the cam and each in height;
   each said cam being formed by a plate in which are formed two elongated and inclined first openings having upper edges constituting said at least one first bearing track, said adjusting means further comprising supports mounted on the slide and rolling elements mounted on the supports for bearing against said first bearing tracks;
   and at least one second bearing track for the bearing of the seat on each cam, the second bearing track having a shape which is a function of a desired attitude-adjusting movement of the seat relative to the cam; and
   means for controlling the height of each cam and seat relative to the respective slide and for controlling the attitude of the seat relative to the respective cam.

2. A device according to claim 1, comprising at least one counter-track provided on each cam, a support mounted on the respective slide, and a rolling or sliding element mounted on the support for bearing against said counter-track which is so arranged as to ensure a play-free displacement of the cam by the bearing tracks provided thereon.

3. A device according to claim 2, comprising an inclined and elongated second opening substantially similar to said first openings and having a lower edge constituting said counter-track, and said lower edge constantly bears against the associated rolling or sliding element.

4. A device according to claim 1, wherein said two inclined, elongated openings provided in each cam have curved openings having profiles for correlating with the desired attitude-adjusting movement.

5. A device according to claim 4, wherein said attitude-adjusting movement is a tilting of the seat about a horizontal transverse axis passing through a point located at a given height in a region provided for the passenger on the seat structure, the seat being provided with rolling or sliding elements which are cooperative with said bearing tracks for the seat on the cam.

6. A device according to claim 4, wherein said rolling or elements are mounted on the seat and the cam is provided with a seat attitude-adjusting counter-track maintained in bearing relation against said rolling or sliding elements mounted on the seat whereby any play of the seat relative to the cam in its attitude-changing movement is eliminated.

7. A device according to claim 6, wherein the seat attitude-adjusting counter-track is an upper edge of an elongated and curved opening provided in the cam.

8. A device according to claim 1, comprising yokes for carrying the respective rolling or sliding elements, the respective yokes being fixed to the slide for the adjustment of the cam in height relative to the slide, and the respective yokes being fixed to the seat for the attitude-adjusting movement of the seat relative to the cam.

9. A device according to claim 1, wherein the means for controlling the height of the cam and seat comprise, for each cam, a jack having one end articulated to the cam and an opposite end articulated to the slide.

10. A device according to claim 9, wherein the jack is articulated to the slide by an arrangement comprising a spindle mounted on the slide and carrying a rolling or sliding element engaged with a respective bearing track, the jack being articulated to said spindle 11. A device according to claim 1, wherein the means for controlling the height of the cam and seat 12. A device according to claim 1, wherein the cam having an elongated inclined opening is provided in the slide in facing relation to the opening provided in the cam, and there extends through said two openings a roller having a spindle and a link is articulated to said spindle and has two opposed ends articulated to the slide and to the cam, the roller being capable of rolling simultaneously on the cam along a bearing track formed by an upper edge of the aforementioned opening in the cam, and on the slide along a bearing track formed by a lower edge of the opening in the slide.

13. A device according to claim 12, said link being rotable by means comprising a jack anchored, on one hand, to the slide, and, on the other hand, to the articulation of the link to the cam.

14. A device according to claim 12, wherein there are formed in the cam and in the slide, in facing relation to each other, two inclined and elongated openings, and a roller rotatively mounted on a spindle mounted on the cam extend through said openings, the mounting of the roller and the dimensioning of the openings being such that the roller rolls in bearing relation to a first counter-track constituted by a lower edge of the opening of the cam and on a second counter-track constituted by an upper edge of the opening of the slide.

15. A device according to claim 12, wherein the ends of the link are provided with elongate apertures, the cam and the slide are provided with elongate apertures, and pins slidably extend through said elongate apertures and slide therein when the link pivots about the spindle of its roller during the adjustment of the cam in height relative to the slide.

16. A device according to claim 14, wherein the ends of the link are provided with elongate apertures, the cam and the slide are provided with elongate apertures, and pins slidably extend through said elongate apertures and slide therein when the link pivots about the spindle of its roller during the adjustment of the cam in height relative to the slide.

17. A device according to claim 12, comprising yokes formed in an upper part of the slide and having two parallel branches, said openings of the slide being provided in said parallel branches of said yokes formed in the upper part of the slide, the cam being interposed between said branches and the rollers and their spindles extending through said branches and said cam.

18. A device according to claim 14, comprising yokes formed in an upper part of the slide and having two parallel branches, said openings of the slide being provided in said parallel branches of said yokes formed in the upper part of the slide, the cam being interposed between said branches and the rollers and their spindles extending through said branches and said cam.

19. A device according to claim 16, comprising yokes formed in an upper part of the slide and having two parallel branches, said openings of the slide being provided in said parallel branches of said yokes formed in the upper part of the slide, the cam being interposed between said branches and the rollers and their spindles extending through said branches and said cam.

20. A device according to claim 16, comprising yokes formed in an upper part of the slide and having two parallel branches, said openings of the slide being provided in said parallel branches of said yokes formed in the upper part of the slide, the cam being interposed between said branches and the rollers and their spindles extending through said branches and said cam.

* * * * *